United States Patent Office 3,814,703
Patented June 4, 1974

3,814,703
COMPOSITION FOR FORMING AN ELECTRICALLY CONDUCTIVE RESIN FILM
Hiroyuki Nakayama and Kiyohiko Asada, Hiratsuka, Japan, assignors to Kansai Paint Co., Ltd., Amagasaki, Hyogo-ken, Japan
No Drawing. Filed May 8, 1972, Ser. No. 252,514
Claims priority, application Japan, May 31, 1971, 46/37,036
Int. Cl. H01b 1/00; H01c
U.S. Cl. 257—500
12 Claims

ABSTRACT OF THE DISCLOSURE

This invention relates to a composition for forming an electrically conductive resin film, which comprises (A) resinous compound obtained by introducing ethylenically carbon-carbon unsaturations in a range of $0.3 \times 10^{-3}$ to $3 \times 10^{-3}$ mol per one gram of the resinous compound and phosphoric acid groups of not more than $2 \times 10^{-3}$ mol per one gram of the resinous compounds as pendant groups into a molecular chain of acrylic copolymer having from about 3000 to about 50,000 of a number average molecular weight and having functional groups in the range of $1 \times 10^{-3}$ to $5 \times 10^{-3}$ mol per one gram of the acrylic copolymer or into a molecular chain of polyvinyl alcohol having from about 100 to about 5000 of polymerization degree and having more than about 50% of the degree of hydrolysis, and (B) a polymerizable ethylenically unsaturated compound having an ionic free group or admixture thereof selected from the group consisting of sulfoalkyl acrylates or methacrylates or salts thereof represented by the following general formula:

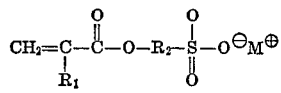

wherein $R_1$ is hydrogen atom or a methyl group, $R_2$ is an alkylene group having 1 to 5 carbon atoms, and M is hydrogen atom, sodium, lithium, potassium, copper, magnesium, aluminium, ammonium group, methyl amine group or ethyl amine group, and phosphoric acid esters or phosphate esters of 2-hydroxyalkyl acrylates or methacrylates represented by the following general formula:

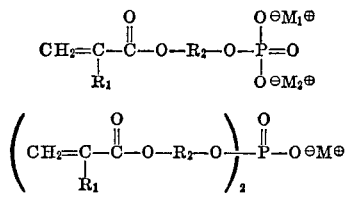

wherein $R_1$ is hydrogen atom or methyl group, $R_2$ is an alkylene group having 2 to 4 carbon atoms, $M_1$ and $M_2$, which may be the same or different, hydrogen atom, sodium, lithium, potassium, copper, magnesium, aluminium, ammonium group, methyl amine group or ethyl amine group, and M is the same as mentioned above,
and may further comprise (C) other polymerizable ethylenically unsaturated compound and/or (D) polymerization initiator and/or an additive.

DETAILED DESCRIPTION OF THE INVENTION

This invention relates to a composition for forming an electrically conductive resin film. More specifically, the invention relates to a novel composition for forming an electrically conductive resin film, which has excellent film-forming properties and can be easily formed into a resin film, excellent in various properties such as transparency, electrical conductivity, mechanical properties, adhesiveness and solvent resistance.

Materials heretofore used for forming electrically conductive resin films are known as resins composed mainly of high molecule polyelectrolytes of a low molecular weight such as polyvinyl benzyl quarternary ammonium salts and metal salts of polystyrene sulfonic acid or polyvinyl pyridine. However, the resins are defective in that their synthesis reaction is very complicated and difficult, which results in high manufacturing costs. Further, it is very difficult to select such reaction conditions that gelation is not caused to occur during the synthesis reaction. Still further, in the case of the resins since a polymer of a low molecular weight is employed as the resin component, the mechanical properties and solvent resistance of the resulting films are extremely poor. Still in addition, films formed from the resins are defective in that their electrical conductivity is highly influenced and changed by the humidity. Because of these defects, these conventional resins fail to give electrically conductive films which may suitably be used for preparing electrically conductive tapes or sheets as microfilms, magnetic tapes and facsimile tapes.

With a view to providing a composition for forming electrically conductive films, which can overcome the above-mentioned defects of the conventional compositions and can give electrically conductive films having excellent properties. As a result of our research we have now found that film formed from a composition comprising a resinous component containing in the molecule polymerizable ethylenically unsaturated groups and/or phosphoric acid groups and a polymerizable ethylenically unsaturated compound having an ionic free group is excellent in variousproperties such as transparency, electrical conductivity, mechanical properties, adhesiveness and solvent resistance, and that said composition can be very simply formed into such excellent film.

Accordingly, the primary object of this invention is to provide a film-forming composition which can be easily formed into an electrically conductive film which is free of such defects as possessed by conventional electrically conductive films. Another object of this invention is to provide a film-forming composition which has excellent film-forming properties and hence can be formed into an electrically conductive film by a simple film-forming operation, said electrically conductive film being excellent in uniformity, smoothness, mechanical properties, solvent resistance, adhesiveness, transparency and other properties required in this field. A further object of this invention is to provide a film-forming composition the electrical conductivity of which is not influenced and not changed by the humidity. Still further objects and advantages of this invention will be apparent from the description given hereinafter.

The above objects of this invention can be achieved by a composition for forming an electrically conductive resin film.

This invention relates to a composition for forming an electrically conductive resin film, which comprises (A) a resinous compound obtained by introducing ethylenically carbon-carbon unsaturations in a range of $0.3 \times 10^{-3}$ to $3 \times 10^{-3}$ mol per one gram of the resinous compound and phosphoric acid groups of not more than $2 \times 10^{-3}$ mol per one gram of the resinous compound as pendant groups into a molecular chain of acrylic copolymer having from about 3,000 to about 50,000 of a number average molecular weight and having functional groups in the range of $1 \times 10^{-3}$ to $5 \times 10^{-3}$ mol per one gram of the acrylic copolymer or into a molecular chain of polyvinyl alcohol having from about 100 to about 5,000 of polymerization degree and having more than about 50% of the degree of hydrolysis, and (B) a polymerizable ethylenically unsaturated compound having an ionic free group or admixture thereof selected from the group consisting of sulfoalkyl acrylates or methacrylates or salts thereof represented by the following general formula:

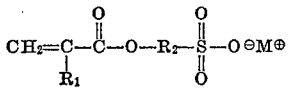

wherein $R_1$ is hydrogen atom or a methyl group, $R_2$ is an alkylene group having 1 to 5 carbon atoms, and M is hydrogen atom, sodium, lithium, potassium copper, magnesium, aluminium, ammonium group, methyl amine group or ethyl amine group, and phosphoric acid esters or phosphate esters of 2-hydroxyalkylacrylates or methacrylates represented by the following general formula:

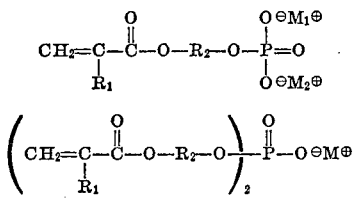

wherein $R_1$ is hydrogen atom or methyl group, $R_2$ is an alkylene group having 2 to 4 carbon atoms, $M_1$ and $M_2$, which may be the same or different, are hydrogen atom, sodium, lithium, potassium, copper, magnesium, aluminium, ammonium group, methyl amine group or ethyl amine group, and M is the same as mentioned above, and may further comprise (C) other polymerizable ethylenically unsaturated compound and/or (D) polymerization initiator and/or an additive.

In the present invention, the term "acrylic copolymer" means the copolymer obtained by copolymerizing acrylic or methacrylic monomer as all or a part of vinyl or vinylidene monomer component. Further, the term "functional groups" means hydroxyl groups, carboxyl groups or epoxy groups as the side chain in the chain of the the acrylic copolymer.

Resinous compounds containing in the molecule polymerizable ethylenically unsaturated groups and phosphoric acid groups, to be used in this invention, may be prepared by introducing polymerizable ethylenically unsaturated groups and/or phosphoric acid goups into acrylic copolymers having hydroxyl, carboxyl, epoxy groups as the side chain.

Such starting acrylic coploymers having functional groups such as hydroxyl, carboxyl, or epoxy groups can be obtained according to customary methods by copolymerizing two or more of monomers containing a hydroxyl, carboxyl, or epoxy group and an ethylenically unsaturated group, or by copolymerizing such monomer with a monomer copolymerizable therewith, such as methyl acrylate, ethyl acrylate, butyl acrylate, methyl methacrylate, ethyl methacrylate and butyl methacrylate.

As the monomer containing a hydroxyl group there may be exemplified 2-hydroxyethyl acrylate, 2-hydroxyethyl methacrylate, 2-hydroxypropyl acrylate, 2-hydroxypropyl methacrylate, allyl alcohol and N-methylol acrylamide. As the monomer containing a carboxyl group there may be mentioned methacrylic acid and acrylic acid. As the monomer containing an epoxy group, there may be exemplified glycidyl acrylate and glycidyl methacrylate.

The acrylic or methacrylic monomer having a phosphoric acid group or sulfonic acid group may also be used as an acrylic or methacrylic monomer to obtain the acrylic copolymer useful in the present invention. Such a phosphoric acid group or sulfonic acid group in the acrylic copolymer acts as a catalyst when the introduction of ethylenically carbon-carbon unsaturations into the acrylic copolymer is carried out; moreover, these groups in the monomer give also a resin film an electrical conductivity. Examples of the acrylic or methacrylic monomers having a phosphoric acid group or a sulfonic acid group are phosphoryl ethylene methacrylate, phosphoryl - 1 - chloromethyl ethylene methacrylate, phosphoryl-bis-acrylate, sulfoethylene methacrylate and sulfoethylene acrylate. These monomers are used with other vinyl or vinylidene monomer, the amount used of these monomers is the range of not more than $2 \times 10^{-3}$ mol per one gram of the resinous compound as the final reaction product. It is undesirable to increase the amount of the monomer having a phosphoric acid group or a sulfonic acid group in the acrylic copolymer since viscosity of the reaction product in the reactor increases undesirably.

The acrylic copolymer used in the present invention has a number average molecular weight of about 3000 to about 50,000. If this molecular weight is lower than about 3000, electrically conductive resin film obtained by using the resinous compound made of such acrylic copolymer is inferior in film-forming property and in mechanical property. On the other hand, if this molecular weight is higher than about 50,000, it is difficult to synthesize the acrylic copolymer. Further the acrylic copolymer obtained is inferior in solubility with solvent and in compatibility with other component used in the present invention.

Introduction of ethylenically carbon-carbon unsaturations into such acrylic copolymers may be accomplished by (1) reacting the acrylic copolymer with an epoxy group-containing ethylenically unsaturated monomer, acrylic acid chloride or methacrylic acid chloride when the acrylic copolymer contains a hydroxyl group, (2) reacting the acrylic copolymer with an epoxy group-containing ethylenically unsaturated monomer when the acrylic copolymer contains a carboxyl group, or (3) reacting the acrylic copolymer with an ethylenically unsaturated monomer containing a hydroxyl or carboxyl group when the acrylic copolymer contains an epoxy group. Introduction of ethylenically carbon-carbon unsaturations into the acrylic copolymers may not be accomplished except by the reacting processes above-mentioned because condensed water by esterification reaction is generated if the reaction is carried out by the combination of other functional groups. In this case, it is difficult to introduce the ethylenically carbon-carbon unsaturations into the acrylic copolymers.

And then, if necessary, introduction of phosphoric acid groups into acrylic copolymers free of any phosphoric acid group may be accomplished by reacting the epoxy groups of such acrylic copolymer with phosphoric acid or by reacting the hydroxyl groups of such acrylic copolymer with phosphorous oxychloride or phosphorous trichloride, and subsequently hydrolyzing the reaction product.

The number of ethylenically carbon-carbon unsaturations to be introduced into the acrylic copolymer is the range of $0.3 \times 10^{-3}$ to $3 \times 10^{-3}$ mol per one gram of the resinous compound which is a final product for the present invention. When this number is less than $0.3 \times 10^{-3}$ mol, the composition in which such resinous compound is used has poor solvent resistance, poor mechanical strength and poor film-forming property. On the other hand, when that number is more than $3 \times 10^{-3}$ mol, storage stability of the composition becomes poor. Further, the number of phosphoric acid groups is not more than $2 \times 10^{-3}$ mols per one gram of the resinous compound which is a final product for the present invention. If introduction of phosphoric acid group becomes more than $2 \times 10^{-3}$ mols, the resinous compound obtained according to the process in this invention is inferior in solubility with solvent and in compatibility with other components used in the present invention. It is not essential to introduce the phosphoric acid groups into the acrylic copolymer.

When phosphoric acid groups are, however, introduced into the acrylic copolymer to prepare the resinous compound having phosphoric acid groups, the resin film formed from the composition containing such resinous compound has a higher electrical conductivity than that of the resin film formed from the composition containing the resinous compound not having phosphoric acid groups.

The resinous compound comprising acrylic copolymer incorporated into the composition of this invention comprises about 10 to about 90% by weight, preferably about 40 to about 80% by weight, based on the composition. When the content of the resinous compound obtained by the acrylic copolymer is less than about 10% by weight, mechanical properties and solvent resistance of resulting electrically conductive films are poor. In case the resinous compound obtained by acrylic copolymer content exceeds about 90% by weight, the resulting films are inferior in electrical conductivity, film uniformity and smoothness.

The second type of the resinous component (A) to be used in this invention is polyvinyl alcohol. The polyvinyl alcohol useful as raw material in the present invention has a polymerization degree of about 100 to about 5000 and a degree of hydrolysis of more than 50%. The ethylenically carbon-carbon unsaturations and, if necessary, phosphoric acid groups are introduced into this polyvinyl alcohol in the same way as described in obtaining the resinous compound from acrylic copolymer to obtain the resinous compound having ethylenically carbon-carbon unsaturations of $0.3 \times 10^{-3}$ to $3 \times 10^{-3}$ mol per one gram of the resinous compound and phosphoric acid groups of not more than $2 \times 10^{-3}$ mol per one gram of the resinous compound. The polyvinyl alcohol can be prepared by saponification of polyvinyl acetate, vinyl acetate-ethylene copolymers, vinyl acetate-styrene copolymers and the like. The resinous compound having ethylenically carbon-carbon unsaturations can be prepared by reacting the hydroxyl groups of such polyvinyl alcohol with polymerizable ethylenically unsaturated monomer having an epoxy group, acrylic acid, methacrylic acid, glycidyl acrylate, glycidyl methacrylate, acrylic acid chloride or methacrylic acid chloride to introduce polymerizable ethylenically unsaturated groups into the polyvinyl alcohol, in which the polymerizable ethylenically unsaturated monomers having an epoxy group are, for example, glycidyl acrylate and glycidyl methacrylate. The resinous compound further having phosphoric acid groups can be prepared by reacting hydroxyl groups of the polyvinyl alcohol with phosphorous compound and subsequently hydrolyzing the reaction product, in which phosphorous compound is phosphorous oxychloride phosphorous pentachloride or phosphorous trichloride.

In this invention, it is preferred that the starting polyvinyl alcohol ester has a degree of hydrolysis of about more than 50% by weight. In the case of a polyvinyl alcohol ester having a degree of hydrolysis of not more than about 50% by weight, the film-forming property of the resulting composition is inferior.

As the polymerizable ethylenically unsaturated compound to be used for introducing polymerizable ethylenically carbon-carbon unsaturations into the above-mentioned polyvinyl alcohol, there may be exemplified acrylic acid, methacrylic acid, glycidyl acrylate, glycidyl methacrylate, acrylic acid chloride, methacrylic acid chloride and the like. As the phosphorous compound to be used for introduction of phosphoric acid groups there may be mentioned phosphorous trichloride, phosphorous pentachloride, phosphorous oxychloride and the like.

In the composition of this invention, the resinous compound obtained by the polyvinyl alcohol into which the functional groups have been introduced is incorporated in an amount of about 10 to about 90% by weight, preferably about 40 to about 80% by weight. In case the content of the resinous compound is less than about 10% by weight, mechanical properties, solvent resistance and surface-curing property of the resulting film are poor, and when the resinous compound content is greater than about 90% by weight, the resulting film is inferior with respect to the film uniformity, smoothness and electrical conductivity.

The polymerizable ethylenically unsaturated compound having an ionic free group (B) to be used in the composition of this invention is a member selected from the group consisting of sulfoalkyl acrylates or methacrylates or salts thereof represented by the following general formula:

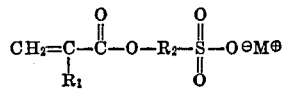

wherein $R_1$ is hydrogen atom or a methyl group $R_2$ is an alkylene group having 1 to 5 carbon atoms, and M is hydrogen atom, sodium, lithium, potassium, copper, magnesium, aluminium, ammonium group, methyl amine group or ethyl amine group (in the present specification, the term "alkylene" is meant to be a divalent saturated hydrocarbon), and phosphoric acid esters and phosphate esters of 2-hydroxyalkyl acrylates or methacrylates represented by the following general formulae:

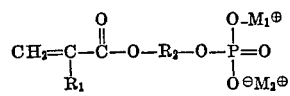

and

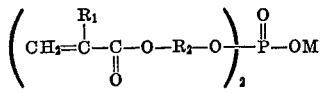

wherein $R_1$ is hydrogen atom or a methyl group, $R_2$ is an alkylene group having 2 to 4 carbon atoms, $M_1$ and $M_2$, which may be the same or different, is hydrogen atom, sodium, lithium, potassium, copper, magnesium, aluminium, ammonium group, methyl amine group or ethyl amine group, and M is the same as mentioned above.

Examples of the sulfoalkyl acrylates or methacrylates which may be mentioned are sulfomethylene acrylate, sulfoethylene acrylate, sulfoethylene methacrylate, sulfotrimethylene acrylate, sulfoisopropylene acrylate, sulfotrimethylene methacrylate, sulfotetramethylene acrylate, sulfotetramethylene methacrylate, sulfopentamethylene acrylate. As the phosphoric acid esters or phosphate esters of 2-hydroxyalkyl acrylates or methacrylates there may be mentioned phosphoryl ethylene acrylate, phosphoryl ethylene methacrylate, phosphoryltrimethylene acrylate, phosphoryl isopropylene methacrylate, phosphoryl trimethylene methacrylate, phosphoryl tetramethylene methacrylate, phosphoryl-1-chloromethyl ethylene methacrylate, phosphoryl-bis-isopropylene methacrylate, phosphoethylene methacrylate, phosphoryl-bis-trimethylene acrylate, phosphoryl-bis-isopropylene methacrylate, phosphoryl - bis-trimethylene methacrylate, phosphoryl-bis-tetramethylene acrylate, phosphoryl-bis-tetramethylene methacrylate and the like.

The salts represented by the above general formulae can be obtained by neutralizing the above-exemplified compounds according to customary methods with bases such as sodium hydroxide, lithium hydroxide, potassium hydroxide, copper hydroxide, magnesium hydroxide and aluminum hydroxide, or with ammonia or methyl amine or ethylamine.

The above-mentioned compounds (B) may be used singly, or they may be used in the form of admixtures of two or more of them. In case the resinous compound (A) is an acrylic copolymer containing in the molecule polymerizable ethylenically unsaturated groups and phosphoric acid groups, the above-mentioned polymerizable ethylenically unsaturated compound having an ionic group (B) is used in an amount of about 10 to about 90% by weight, preferably about 20 to 60% by weight. In case the resinous compound (A) is a polyvinyl alcohol containing in the molecule polymerizable ethylenically unsaturated groups and phosphoric acid groups, the polymerizable ethylenically unsaturated compound (B) is incorporated in the composition of this invention in an amount of about 10 to about 90% by weight, preferably about 20 to about 60% by weight. When the polymerizable ethylenically unsaturated compound (B) is incorporated in the composition of this invention in an amount exceeding the above-mentioned range, the composition is inferior to the film-forming property and the resulting film is inferior to the characteristics such as mechanical property, water resistance, solvent resistance, chemical resistance, durability etc. of the film. When the content of the polymerizable ethylenically unsaturated compound (B) is below the above-mentioned range, the resulting film has inferior electrical conductivity.

In addition to the above-mentioned indispensable ingredients (A) and (B), the composition of this invention may further comprise other polymerizable ethylenically unsaturated compounds (C). This unsaturated compound (C) is incorporated to further improve the film-forming property of the composition and the mechanical properties, solvent resistance and other characteristics of the resulting electrically conductive film. In this invention it is essential that the unsaturated compound (C) should be compatible with the resinous compound (A) including in the molecule polymerizable ethylenically unsaturated groups and phosphoric acid groups.

As such polymerizable ethylenically unsaturated compounds (C), there are preferably used compounds containing one polymerizable ethylene group.

These compounds are, for example, represented by the following three general formulas:

(1) styrene and its derivatives

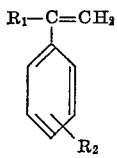

in which $R_1$ is hydrogen or methyl group and $R_2$ is hydrogen, methyl group or chlorine.

(2) acrylic or methacrylic monomers

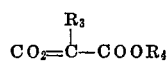

in which $R_3$ is hydrogen or methyl group and $R_4$ is hydrogen, alkyl group having 1 to 16 carbon atoms, hydroxyalkyl group having 2 to 3 carbon atoms, glycidyl group and dialkylamino alkyl group

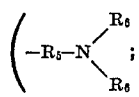

$R_5$ is alkylene group having 1 to 2 carbon atoms and $R_6$ is alkyl group having 1 to 2 carbon atoms)

and (3) vinylidene compounds

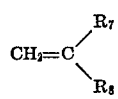

in which $R_7$ is hydrogen or methyl group and $R_8$ is nitrile group, carbamoyl group, N-methylolcarbamoyl group, alkylether N-methylolcarbamoyl group

$R_9$ is alkyl group having 1 to 4 carbon atoms) or acetoxy group.

Examples of compounds (1) are styrene, vinyl, toluene, 2-methyl styrene and chlorostyrene.

Examples of compounds (2) are acrylic acid, methacrylic acid, methyl acrylate, methyl methacrylate, butyl acrylate, butyl methacrylate, 2-ethyl hexyl acrylate, 2-ethyl hexyl methacrylate, octyl acrylate, octyl methacrylate, lauryl methacrylate, 2-hydroxyethyl acrylate, 2-hydroxyethyl methacrylate 2-hydroxypropyl acrylate, 2-hydroxypropyl methacrylate, glycidyl acrylate, glycidyl methacrylate, dimethylaminomethyl acrylate, dimethylaminoethyl methacrylate, diethylaminoethyl acrylate and diethylaminoethyl methacrylate.

Examples of compounds (3) are acrylonitrile, methacrylonitril, acrylamide, methacrylamide, ethylether-N-methyol acrylamide, ethylether-N-methylol methacrylamide, butylether-N-methylol acrylamide, propylether-N-methylol methacrylamide and vinyl acetate. These compounds may be used independently or a mixture of two or more compounds. They give a good film-forming property and excellent mechanical properties, solvent resistance and other characteristics of the resulting electrically conductive film. These compounds are used in amounts of less than about 30 parts by weight, preferably less than about 20 parts by weight, per 100 parts by weight of the total of the resinous compound (A) and the polymerizable ethylenically unsaturated compound (B). In case these compounds are used in amounts exceeding about 30 parts by weight per 100 parts by weight of the total of the ingredients (A) and (B), stickiness is caused to appear on the film surfaces even after curing, and the electrical conductivity and solvent resistance of the resulting films are inferior.

In addition, as the component (C) there may be used polyfunctional unsaturated compounds having two or more polymerizable ethylenically unsaturated groups, such as unsaturated urethane compounds having two or more polymerizable ethylenically unsaturated groups, which may be prepared by reacting an ethylenically unsaturated compound having one hydroxyl group with a polyisocyanate compound having two or more isocyanate groups and/or a polyhydric alcohol having two or more hydroxyl groups; unsaturated esters formed by the reaction between an ethylenically unsaturated compound having one carboxyl group and a polyhydric alcohol having two or more hydroxyl groups; N,N'-alkylene-bis-acrylamides; N,N'-alkylene-bis-methacrylamides; dimaleylimides; and diallyl compounds. These compounds are especially effective for improving mechanical properties and solvent resistance in the resulting films. These compounds may be used in amounts of less than about 60 parts by weight, preferably less than about 40 parts by weight, per 100 parts by weight of the total of the ingredients (A) and (B). When these compounds are incorporated in amounts exceeding about 60 parts by weight per 100 parts by weight of the total of the ingredients (A) and (B), stickiness is caused to appear on the surfaces of the resulting films and their electrical conductivity is reduced.

The above-mentioned compounds may be used singly, or admixtures of two or more of them can also be used.

Incorporation of a polymerization initiator is not particularly critical in the composition of this invention when an energy source having an ability sufficient to initiate the polymerization, for instance an ionizing radiation such as an electron radiation or the like, is applied. However, even in such case, the presence of a polymerization initiator in the composition of this invention does not bring about any disadvantage.

In case a polymerization initiator is incorporated in the composition of this invention, it is preferred that it is used in an amount of less than 10 parts by weight, especially less than 5 parts by weight, per 100 parts by weight of the total of the ingredients (A) and (B). Suitable polymerization initiators are chosen, depending on the kind of the energy force to be applied, among known initiators such as organic peroxides, organic azo compounds, organic sulfur compounds, organic carbonyl compounds and metal salts. These initiators may be used singly or in the form of admixtures of two or more of them.

As an additive for improving the electrical conductivity, there may be employed powders of metals such as zinc, silver, copper, gold and iron, and electrically conductive fillers such as carbon black. Dyestuffs may be incorporated in the composition of this invention for coloration thereof. It is also possible to incorporate an ordinary, electrically non-conductive resin in the composition of this invention, whereby the electrical conductivity of the resulting film can be adjusted depending on the intended use of the film.

Formation of an electrically conductive resin film from the composition of this invention may easily be accomplished only by exposing the composition under heat rays, actinic light rays and ionizing irradiation. In the case of heating, the composition is heated at temperatures ranging from about 50 to about 150° C. At temperatures lower than about 50° C., cross linking reaction is not caused to occur, and at temperatures exceeding about 150° C. foaming is caused to occur. In case a film is formed from the composition of this invention by irradiation of actinic light rays, a light source emitting rays having a wavelength ranging from about 2500 to about 6000 angstrom units is used. Further, by irradiation of ionizing radiation such as gamma rays and electron beam it is possible to form the composition of this invention for a short period of time with ease into the intended electrically conductive resin film. Thus, the range of sources for initiation of polymerization applicable to the composition of this invention is very broad.

The resin film formed by cross-linking the composition of this invention is excellent over conventional products with respect to the transparency, mechanical properties and solvent resistance. Further, the resin film formed from the composition of this invention exhibits a much lower electrical resistance than conventional products. For instance, at a relative humidity of 50% it shows such a low volume resistivity as $10^4$–$10^7 \Omega$. Moreover, the resin film formed from the composition of this invention is especially advantageous over conventional products in that the resistivity is not so influenced by the change in the relative humidity as in conventional products. More specifically, in conventional products the resistivity at a relative humidity of 30% is about 1000 times as high as that at a relative humidity of 80%, whereas in the resulting film according to this invention the resistivity at a relative humidity of 30% is about 10 times as high as that at a relative humidity of 80%.

Unlike conventional film products formed by evaporation and drying of starting compositions, in this invention films are formed by exposing the composition to heat rays, actinic light rays, ionizing irradiation and the like. Accordingly, such films have mechanical properties and solvent resistance much superior to those of conventional products, with the consequence that films according to this invention are very excellent in durability. Still further, as-formed films of the composition of this invention can be cured for a very short period of time and are excellent in adhesiveness. When a polymerizable ethylenically unsaturated compound (C) is incorporated into the composition of this invention, the as-formed film of the composition of this invention exhibits especially excellent film-forming characteristics. Still further, in this invention, since compounds of relatively low molecular weights are used for forming the composition, synthesis of the starting compounds can be accomplished very easily, with the result that the manufacturing costs are very low and economical advantages are great. Additionally, in this invention an electrically conductive film can be prepared from a resinous composition alone, and therefore, the film are excellent transparency. When actinic light rays having an image are applied in preparing a resin film from the composition of this invention and the unreacted composition is removed, there can be reproduced an image having an electrical conductivity. As detailed hereinabove, the electrically conductive resin film formed from the composition of this invention has a structure quite different from those of conventional products and can be used in various fields broadly. Because of high adhesiveness of the composition of this invention and excellent surface-curing property, the composition of this invention is especially excellent as a costing material for forming electrically conductive tapes or sheets such as microfilms, magnetic tapes and facsimile tapes.

This invention will now be explained in more detail by referring to Examples, but this invention is not at all limited by those Examples.

Synthesis examples illustrating preparation of acrylic copolymers containing in the molecule polymerizable ethylenically unsaturated groups and further phosphonic acid groups Example 1.—With use of a flask equipped with a stirrer, a thermometer, a reflux cooler, a dropping funnel and a nitrogen gas-introducing tube, a mixture of 200 g. of hydroxyethyl methacrylate, 200 g. of ethyl methacrylate and 2 g. of azobisisobutyronitrile was added dropwise to 400 g. of acetone as solvent under agitation over a period of about 2.5 hours at a temperature maintained at 63–64° C., and the reaction was conducted for about 2 hours at the above temperature. Then, the reaction mixture was cooled to about 30° C. and 8 g. of triethylamine was added thereto, following which the mixture was agitated sufficiently. Then, 60 g. of glycidyl methacrylate and 60 cc. of acetone were added dropwise to the reaction mixture over a period of about 1 hour following which the reaction was conducted for about 24 hours at about 50° C. to obtain an addition copolymer (in the form of a solution of a solid content of 50%).

Example 2.—100 grams of the addition copolymer obtained in Example 1 was added dropwise to 2 g. of phosphorus oxychloride ($POCl_3$) and 50 cc. of acetone under agitation over a period of about 1 hour at a temperature maintained at about 10° C. After completion of the dropwise addition, the temperature was elevated to about 20° C. and the reaction was carried out for about 2 hours. Then, 100 g. of water was added to the reaction mixture and the reaction was furthered at the above temperature for about 1 hour. The resulting reaction product was thrown into a great quantity of water to obtain a polymer. The amount obtained of the polymer was 40 g. The polymer was employed in the form of a 50% solution in tetrahydrofuran.

Example 3.—200 grams of glycidyl methacrylate, 300 g. of ethyl methacrylate and 2.5 g. of azobisisobutyronitrile were added dropwise to 500 g. of acetone under agitation over a period of about 2 hours at a temperature maintained at 63–65° C., following which the reaction was conducted at the above temperature for about 2 hours. 80 grams of acrylic acid, 80 g. of acetone and 10 g. of triethylamine were added dropwise to the reaction mixture at the same temperature over a period of about 1 hour, and the reaction was furthered for about 1 hour to obtain an addition copolymer (in the form of a solution of a solid content of 50%).

Example 4.—10 grams of phosphoric acid and 10 g. of acetone were added to 100 g. of the addition copolymer obtained in Example 3 under agitation over a period of 30 minutes at about 10° C. The temperature was elevated to about 20° C. and the reaction was carried out for about 2 hours to obtain an addition copolymer (in the form of a solution of a solid content of 50%).

Example 5.—100 grams of hydroxyethyl methacrylate, 50 g. of phosphoryl ethylene methacrylate, 350 g. of ethyl methacrylate and 2.5 g. of azobisisobutyronitrile were added dropwise to 500 g. of acetone under agitation at 62–64° C. over a period of about 1.5 hours, and the reaction was continued for about 2 hours. The reaction mixture was cooled to about 20° C. and 5 g. of triethylamine was added thereto, following which the mixture was agitated sufficiently. Then 25 g. of glycidyl methacrylate and 25 g. of acetone were added dropwise to the mixture over a period of about 30 minutes and the reaction was carried out at the above temperature for about 1 hour to obtain an addition copolymer (in the form of a solution of a solid content of 50%).

Example 6.—100 grams of the addition copolymer synthesized in Example 5 was added dropwise to 3 g. of phosphorous oxychloride and 50 g. of acetone under agitation at about 10° C. over a period of about 1 hour, and the temperature was raised to about 20° C. and the reaction was carried out for about 2 hours. Further, 100 g. of water was added to the reaction mixture and the reaction was continued for another about 2 hours at the above temperature. The resulting reaction product was thrown into a great quantity of water to obtain 35 g. of a polymer. The polymer was employed in the form of a 50% solution in tetrahydrofuran.

Example 7.—An addition copolymer (in the form of a solution of a solid content of 50%) was prepared in the same manner as in Example 5 by employing 50 g. of sulfoethylene methacrylate instead of the phosphoryl ethylene methacrylate used in Example 5.

Example 8.—100 grams of acrylic acid, 300 g. of ethyl methacrylate and 2 g. of azobisisobutyronitrile were added dropwise to 400 g. of acetone under agitation at 63–65° C. over a period of about 2.5 hours, and the reaction was furthered for about 2 hours. Then, the reaction mixture was cooled to about 30° C. and 8 g. of triethylamine was added thereto, following which the mixture was agitated sufficiently. 60 grams of glycidyl methacrylate and 60 g. of acetone were added dropwise to the reaction mixture over a period of about 1 hour, and the temperature was elevated to about 50° C. and the reaction was further continued for about 24 hours to obtain an addition copolymer (in the form of a solution of a solid content of 50%).

Synthesis examples illustration preparation of polyvinyl alcohol derivatives containing in the molecule polymerizable ethylenically unsaturated groups and/or phosphoric acid groups Example 9.—In the same reactor as used in Example 1, 5 g. of glycidyl methacrylate and 20 g. of acetone were added dropwise to 50 g. of a polyvinyl alcohol (having a degree of polymerization of 1500 and a degree of hydrolysis of 50%), 200 g. of acetone, 1 g. of triethylamine and 1 g. of hydroquinone under agitation at a temperature maintained at about 60° C. over a period of about 30 minutes, and the reaction was carried out at the above temperature for about 2 hours to obtain a polyvinyl alcohol derivative solution of a solid content of 25%.

Example 10.—100 grams of the polyvinyl alcohol derivative solution obtained in Example 9 was added dropwise to 2 g. of phosphorous oxychloride (POCl$_3$) and 50 g. of acetone under agitation at a temperature maintained at about 15° C. over a period of about 1 hour, and the reaction was conducted at the above temperature for about 2 hours. The temperature was reduced to about 10° C. and 200 g. of water was added dropwise to the reaction mixture over a period of about 30 minutes. Then, the temperature was elevated to about 70° C. and the reaction was furthered for about 30 minutes. The resulting reaction product was thrown into a great quantity of water to precipitate the resulting polymer. The yield of the polymer was 20 g. The polymer was employed in a 25% solution in a mixed solvent of methylethylketone and tetrahydrofuran of a mixing ratio of 1/1.

Example 11.—5 grams of glycidyl methacrylate and 20 g. of methylethylketone were added dropwise to 50 g. of a styrene-vinyl acetate copolymer (completely saponified product having a degree of polymerization of 800 and a styrene/vinyl acetate weight ratio of 1/1), 140 g. of methylethylketone, 40 g. of tetrahydrofuran, 10 g. of xylene, 1 g. of triethylamine and 1 g. of hydroquinone under agitation at a temperature maintained at about 60° C. over a period of about 30 minutes, and the reaction was carried out at the above temperature for about 2 hours to obtain a copolymer solution having a solid content of 25%.

Example 12.—5 grams of glycidyl acrylate and 20 g. of methylethylketone were added dropwise to 50 g. of polyvinyl alcohol (having a degree of polymerization of 1500 and a degree of hydrolysis of 80%), 100 g. of methylethylketone, 50 g. of ethanol, 50 g. of tetrahydrofuran, 1 g. of triethylamine and 1 g. of hydroquinone under agitation at a temperature maintained at about 60° C. over a period of about 30 minutes, and they were reacted at the above temperature for about 2 hours to obtain a polyvinyl alcohol derivative solution having a solid content of 25%.

Example 13.—100 grams of the polyvinyl alcohol derivative solution obtained in Example 12 was added dropwise to 2 g. of phosphorous trichloride (PCL$_3$) and 50 g. of methylethylketone under agitation at a temperature maintained at about 15° C. over a period of about 1 hour, and they were reacted at the above temperature for about 2 hours. The temperature was lowered to about 10° C. and 200 g. of water was added dropwise to the reaction mixture over a period of about 30 minutes. Then the temperature was elevated to about 70° C. and the reaction was carried out for about 30 minutes. The resulting reaction product was thrown into a great quantity of water to precipitate the resulting polymer, whose yield was 25 g. The polymer was used in a 25% solution in a mixed solvent of methylethylketone and tetrahydrofuran of a mixing ratio of 1/1.

Examples illustrating preparation of film-forming compositions, formation of resin films and results of tests of their properties Examples 14–37.—14 grams of the addition copolymer obtained in Example 1 (in the form of a solution of a solid content of 50%), 3 g. of sulfoethylene methacrylate (SEM) and 0.1 g. of benzoin ethyl ether were mixed sufficiently to form a film-forming composition. The composition was coated on a Tetron sheet (size=105 mm. x 105 mm.; thickness=100$\mu$) by means of a bar coater (No. 48). The coated sheet was allowed to stand still at room temperature so as to remove the solvent from the composition. Then the coated composition was cured by photo-irradiation, and the film thickness, surface resistivity and solvent resistance were determined. Results are shown in Table 1 (Example 14).

20 grams of the polyvinyl alcohol derivative solution obtained in Example 9, 3 g. of sulfoethylene methacrylate (SEM), 2 g. of the same esterified product (methacrylic acid: NK–14G) and 0.1 g. of benzoin ethyl ether were mixed sufficiently to form a film-forming composition. The composition was coated on a Tetron sheet (size=105 mm. x 105 mm.; thickness=100$\mu$) by means of a bar coater (No. 48). The coated sheet was allowed to stand still at room temperature for 30 minutes so as to remove the solvent from the composition. The coated composition was cured by photo-irradiation. The film thickness, surface resistivity and solvent resistance were determined. Results are shown in Table 1 (Example 28).

Compositions indicated in Table 1 were formed into films in a manner as described above, and the film thickness, surface resistivity and solvent resistance were determined (Examples 15–27 and 29–37).

In these Examples, the film thickness and surface resistivity were determined at a relative humidity of 50% and a temperature of 20° C. The photo-irradiation for curing was effected by employing as a light source a 400 w. high pressure mercury lamp (model H400P manufactured by Tokyo Shibaura Denki Kabushiki Kaisha), and the curing was conducted at room temperature with a irradiation distance of 50 cm. In the case of electron beam irradiation curing, an electron beam of an acceleration voltage of 250 kv. and a density of about 50 μa./cm.² was irradiated to impart an absorbed dose of 1 Mrad. to the composition for curing.

From the results of measurement tests, it was seen that compositions obtained in Examples 14–37 had a good electrical conductivity, and their surfaces were completely cured under photo-irradiation or electron beam irradiation or by heating (80° C., 30 minutes) and no stickiness was found remaining thereon. Further, the solvent resistance of the films was excellent. Thus it was confirmed that these compositions were very suitable as coating materials for forming tapes.

TABLE 1

| Example Number | Resinous component A [2] (amount used) | Component B [3] (amount used) | Component C [4] (amount used) | Polymerization initiator (amount used) | Curing condition | Film thickness (μ) | Solvent resistance [5] | Surface resistivity [6] (Ω) |
|---|---|---|---|---|---|---|---|---|
| 14 | ACS obtained in Example 1 (14 g.) | SEM (3 g.) | | Benzoin ethyl ether (0.1 g.) | PR (10 minutes) | 15 | 5 days | 5.2×10⁵ |
| 15 | ACS obtained in Example 1 (10 g.) | SEA (3 g.) | NK-14G (2 g.) | do | do | 18 | 4 days | 3.1×10⁵ |
| 16 | ACS obtained in Example 1 (12 g.) | PEM-Cl (4 g.) | | do | PR (5 minutes) | 16 | More than 7 days | 9.2×10⁵ |
| 17 | ACS obtained in Example 2 (12 g.) | PEM (4 g.) | | do | do | 16 | do | 2.5×10⁵ |
| 18 | ACS obtained in Example 3 (14 g.) | SEM (3 g.) | | do | PR (10 minutes) | 15 | 5 days | 6.8×10⁵ |
| 19 | ACS obtained in Example 4 (8 g.) | PTM (4 g.) | AUT-1000E (2 g.) | Benzoin (0.1 g.) | PR (5 minutes) | 21 | More than 7 days | 9.8×10⁴ |
| 20 | ACS obtained in Example 4 (10 g.) | PEM (3 g.) | EMA (1 g.) | Benzoin ethyl ether (0.1 g.) | do | 18 | do | 7.8×10⁵ |
| 21 | ACS obtained in Example 5 (9 g.) | Potassium salt of SEM (3.0 g.) | NK-23G (2.5 g.) | Benzoin (0.2 g.) | do | 20 | 3 days | 7.2×10⁴ |
| 22 | ACS obtained in Example 6 (10 g.) | PEM-Cl (3 g.) | AUT-400E (2 g.) | Butyl peroxide (0.1 g.) | 80° C., 30 minutes | 19 | More than 7 days | 9.9×10⁴ |
| 23 | do | PDEA (3 g.) | AUT-1000E (3 g.) | Azobisisobutyronitrile (0.4 g.) | do | 19 | do | 9.8×10⁴ |
| 24 | ACS obtained in Example 7 (10 g.) | PEM (3 g.) | NK-14G (0.5 g.) | | ER | 18 | do | 3.2×10⁶ |
| 25 | ACS obtained in Example 8 (8 g.) | PEM-TEA (3 g.) | EMA (1.5 g.) | | ER | 16 | do | 4.1×10⁵ |
| 26 | ACS obtained in Example 2 (14 g.) | SEM (2 g.) | NK-14G (1 g.) | Benzoin ethyl ether (0.1 g.) | PR (5 minutes) | 15 | do | 9.0×10⁵ |
| 27 | ACS obtained in Example 3 (8 g.) | PEM (6 g.) | NK-14G (2 g.) | do | do | 17 | do | 5.6×10⁵ |
| 28 | PDS obtained in Example 14 (20 g.) | SEM (3 g.) | NK-14G (2 g.) | do | do | 10 | 3 days | 1.2×10⁶ |
| 29 | do | PFM-Cl (4 g.) | AUT-1000 E (1 g.) | do | do | 10 | More than 7 days | 8.1×10⁶ |
| 30 | PDS obtained in Example 14 (18 g.) | SEA (2 g.) | NK-23G (2.5 g.) | Butyl peroxide (0.3 g.) | 80° C., 30 minutes | 11 | do | 1.0×10⁷ |
| 31 | PDS obtained in Example 15 (20 g.) | PEM (7 g.) | | Benzoin (0.2 g.) | PR (5 minutes) | 10 | do | 7.5×10⁵ |
| 32 | PDS obtained in Example 15 (24 g.) | Potassium salt of SEM (1.5 g.) | AUT-400E (2 g.) | | ER | 9 | 5 days | 8.9×10⁵ |
| 33 | PDS obtained in Example 16 (20 g.) | PDEA (2 g.) | NK-14G (2 g.) | Butyl peroxide (0.2 g.) | 80° C., 30 minutes | 9 | More than 7 days | 2.9×10⁶ |
| 34 | PDS obtained in Example 17 (24 g.) | PTA (6 g.) | EA (2 g.) | Benzoin ethyl ether (0.1 g.) | PR (5 minutes) | 10 | do | 5.1×10⁴ |
| 35 | do | PEM (4 g.) | AUT-1000E (2 g.) | | ER | 10 | do | 6.2×10⁵ |
| 36 | PDS obtained in Example 18 (20 g.) | PEM-TEA (3 g.) | KN-14G (2 g.) | Benzoin (0.2 g.) | PR (5 minutes) | 10 | do | 7.9×10⁶ |
| 37 | PDS obtained in Example 18 (24 g.) | PEM (4 g.) | | Benzoin ethyl ether (0.2 g.) | do | 9 | do | 1.2×10⁶ |

[1] In each Example the sample composition was prepared by mixing components indicated in Table 1 in amounts a so indicated in Table 1 (parenthesized values) by sufficient agitation.
[2] The component A indicates a solution of the resinous component containing in the molecule polymerizable ethylenically unsaturated groups and, if necessary, phosphoric acid groups.
[3] The component B indicates a polymerizable ethylenically unsaturated compound having an ionic free group. Abbreviations and structural formulae of the component B are shown in Table 2 given below.
[4] The component C indicates a polymerizable ethylenically unsaturated compound. Abbreviations and structural formulae of the component C are shown in Table 2 given below.
[5] The coated sheet was dipped into monochlorobenzene, and the number of days which had passed before the coated film began to change was counted.
[6] The electrical conductivity (surface resistivity) was determined by employing a super-high resistance measuring electrode (mode TR-43 manufactured by Takeda Riken) and an ammeter (manufactured by Yokokawa Denki Kabushiki Kaisha) according to the test method of JIS-K-6273 and the method disclosed in "Handbook of Plastics Tests" (published by Nikkan Kogyo Shinburn-Sha).

NOTES:
ACS=Addition copolymer solution.
PDS=Polyvinyl alcohol solution.
PR=Photo-irradiation.
ER=Electron beam irradiation.

TABLE 2

| Nomenclature | | Structural formula, composition or preparation method |
|---|---|---|
| Abbreviation Component B: | | |
| PEM | Phosphoryl ethylene methacrylate | $CH_2=C(CH_3)-C(=O)-O-CH_2-CH_2-O-P(=O)(OH)_2$ |
| PEM-Cl | Phosphoryl-1-chloromethyl ethylene methacrylate | $CH_2=C(CH_3)-C(=O)-O-CH_2-CH(OPO_3H_2)-CH_2Cl$ |
| PTM | Phosphoryl tetramethylene methacrylate | $CH_2=C(CH_3)-C(=O)-O-CH_2-CH_2-CH_2-CH_2-O-P(=O)(OH)_2$ |
| PEN-TEA | | Obtained by neutralizing PEM with triethylamine. |

TABLE 2—Continued

| Nomenclature | | Structural formula, composition or preparation method |
|---|---|---|
| PDEA | Phosphoryl-bis-ethylene acrylate | $$\begin{array}{c} \text{H} \\ \text{CH}_2\!=\!\overset{|}{\text{C}}\!-\!\underset{\underset{\text{O}}{\|}}{\text{C}}\!-\!\text{O}\!-\!\text{CH}_2\!-\!\text{CH}_2\!-\!\text{O} \\ \text{H} \\ \text{CH}_2\!=\!\overset{|}{\text{C}}\!-\!\underset{\underset{\text{O}}{\|}}{\text{C}}\!-\!\text{O}\!-\!\text{CH}_2\!-\!\text{CH}_2\!-\!\text{O} \end{array} \!\!\!\overset{\text{OH}}{\underset{\text{O}}{\diagdown\!\text{P}\!\diagup}}$$ |
| SEA | Sulfoethylene acrylate | $\text{CH}_2\!=\!\underset{\text{H}}{\overset{\|}{\text{C}}}\!-\!\underset{\underset{\text{O}}{\|}}{\overset{\text{O}}{\|}}\text{C}\!-\!\text{O}\!-\!\text{CH}_2\!-\!\text{CH}_2\!-\!\underset{\underset{\text{O}}{\|}}{\overset{\text{O}}{\|}}\text{S}\!-\!\text{OH}$ |
| Potassium salt of SEA | | Obtained by neutralizing SEA with potassium hydroxide. |
| SEM | Sulfoethylene methacrylate | $\text{CH}_2\!=\!\underset{\text{CH}_3}{\overset{\|}{\text{C}}}\!-\!\underset{\underset{\text{O}}{\|}}{\overset{\text{O}}{\|}}\text{C}\!-\!\text{O}\!-\!\text{CH}_2\!-\!\text{CH}_2\!-\!\underset{\underset{\text{O}}{\|}}{\overset{\text{O}}{\|}}\text{S}\!-\!\text{OH}$ |
| Abbreviation Component C: | | |
| AUT-400E | | Unsaturated urethane compound obtained by reacting 2 moles of 2-hydroxyethyl methacrylate, 2 moles of tolylene diisocyanate and 1 mole of polyethylene glycol (molecular weight=400). |
| AUT-1000E | | Unsaturated urethane compound obtained by reacting 2 moles of 2-hydroxyethyl methacrylate, 2 moles of tolylene diisocyanate and 1 mole of polyethylene glycol (molecular weight=1,000). |
| NK-14G | | Unsaturated esterified product obtained by reacting 1 mole of polyethylene glycol (molecular weight=630) and 2 moles of methacrylic acid. |
| NK-23G | | Unsaturated esterified product obtained by reacting 1 mole of polyethylene glycol (molecular weight=1,000) and 2 moles of methacrylic acid. |
| EMA | Ethyl methacrylate | $\text{CH}_2\!=\!\underset{\underset{\text{CH}_3}{\|}}{\text{C}}\!-\!\text{COOC}_2\text{H}_5$ |

Example 38.—The relation between the electrical conductivity and the relative humidity in the electrically conductive composition was examined with use of compositions used in Examples 20 and 32. The curing and test procedures were similar to those described in Example 14. Results are shown in Table 3. From the results it was seen that in these compositions the electrical conductivity was not so greatly influenced by the relative humidity as in conventional products.

TABLE 3

| Surface resistivity (Ω) | Relative humidity (20° C.) | | |
|---|---|---|---|
| | 20% | 50% | 79% |
| Composition of Example 20 | $3.3 \times 10^5$ | $7.8 \times 10^5$ | $3.6 \times 10^5$ |
| Composition of Example 32 | $5.1 \times 10^5$ | $8.9 \times 10^5$ | $3.1 \times 10^5$ |

Example 39.—A sample of the resinous composition indicated in Table 4 given below was cast on a glass plate and allowed to stand still at room temperature for about 30 minutes so as to remove the solvent therefrom. Then the cast composition was cured under photo-irradiation and cut into specimens having a size of 10 mm. x 20 mm. and a thickness of 0.08–0.12 mm. The specimen was then subjected to the tensile test conducted with use of a Tensilon-type universal tensile tester (model UT-II manufactured by Toyo Sokki). Results were excellent as shown in Table 4 below.

TABLE 4

| Sample composition Example— | Tensile strength (kg./cm.²) |
|---|---|
| 14 | 210 |
| 17 | 170 |
| 18 | 160 |
| 19 | 150 |
| 21 | 100 |
| 29 | 320 |
| 31 | 390 |
| 35 | 220 |
| 37 | 230 |
| Conventional product* | 70 |

*Product commercially available sold under the trade name "Dower" by the Dow Chemical Company.

What is claimed is:

1. A composition for forming an electrically conductive resin film which comprises (A) 10 to 90% by weight of resinous compound having ethylenically carbon-carbon unsaturations in a range of $0.3 \times 10^{-3}$ to $3 \times 10^{-3}$ mol per one gram of the resinous compound and phosphoric acid groups of not more than $2 \times 10^{-3}$ mol per one gram of the resinous compound as pendant groups, said resinous compound being a reaction product of an acrylic copolymer having from about 3,000 to about an average number molecular weight and having functional groups in a range of $1 \times 10^{-3}$ to $5 \times 10^{-3}$ mol per one gram of the acrylic copolymer with an ethylenically unsaturated monomer having functional group and a phosphoric acid or phosphorous compound or reaction product of polyvinyl alcohol having from about 100 to about 5000 of polymerization degree and having more than 50% of a degree of hydrolysis with ethylenically unsaturated monomer having functional group and phosphorous compound, and (B) 90 to 10% by weight of a polymerizable ethylenically unsaturated compound having an ionic free group or admixture thereof selected from the group consisting of sulfoalkyl acrylates or methacrylates or salts thereof represented by the following general formula:

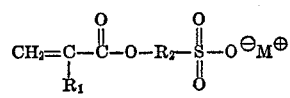

wherein $R_1$ is hydrogen atom or a methyl group, $R_2$ is an alkylene group having 1 to 5 carbon atoms, and M is hydrogen atom, sodium, lithium, potassium, copper, magnesium, aluminium, ammonium group, methyl amine group or ethyl amine group, and phosphoric acid esters or phosphate esters of 2-hydroxyalkyl acrylates or methacrylates represented by the following general formula.

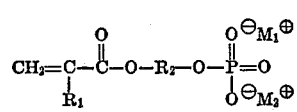

or $$\left(\text{CH}_2\!=\!\underset{\underset{R_1}{|}}{\text{C}}\!-\!\underset{\underset{\text{O}}{\|}}{\text{C}}\!-\!\text{O}\!-\!\text{R}_2\!-\!\text{O}\!\right)_{\!2}\!\underset{\underset{\text{O}}{\|}}{\text{P}}\!-\!\text{O}^\ominus\text{M}^\oplus$$

wherein $R_1$ is hydrogen atom or methyl group, $R_2$ is an alkylene group having 2 to 4 carbon atoms, $M_1$ and $M_2$ which may be the same or different, hydrogen atom sodium, lithium, potassium, copper, magnesium, aluminium, ammonium group, methyl amine group or ethyl amine group, and M is the same as mentioned above.

2. A composition for forming an electrically conductive resin film according to claim 1, in which said acrylic copolymer is copolymer of two or more monomers containing a functional group selected from the group consisting of hydroxyl, carboxyl and epoxy group and an ethylenically unsaturated group, or copolymer of such monomers with a monomer copolymerizable therewith selected from the group consisting of methyl acrylate, ethyl acrylate, butyl acrylate, methyl methacrylate, ethyl methacrylate and butyl methacrylate.

3. A composition for forming an electrically conductive resin film according to claim 2, in which monomers containing a hydroxyl group as a functional group and an ethylenically unsaturated group are selected from the group consisting of 2-hydroxyethyl acrylate, 2-hydroxyethyl methacrylate, 2-hydroxypropyl acrylate, 2-hydroxypropyl methacrylate, allyl alcohol and N-methylol acrylate.

4. A composition for forming an electrically conductive resin film according to claim 2, in which monomers containing a carboxyl group as a functional group and an ethylenically unsaturated group are selected from the group consisting of methacrylic acid and acrylic acid.

5. A composition for forming an electrically conductive resin film according to claim 2, in which monomers containing an epoxy group as a functional group and an ethylenically unsaturated group are selected from the group consisting of glycidyl acrylate and glycidyl methacrylate.

6. A composition for forming an electrically conductive resin film according to claim 1, in which said polyvinylalcohol is a saponification product of one selected from the group consisting of polyvinyl acetate, vinyl acetate-ethylene copolymers and vinyl acetate-styrene copolymers.

7. A composition for forming an electrically conductive resin film according to claim 1, in which said sulfoalkyl acrylates or methacrylates are selected from the group consisting of sulfomethylene acrylate, sulfoethylene acrylate, sulfoethylene methacrylate, sulfotrimethylene acrylate, sulfoisopropylene acrylate, sulfotrimethylene methacrylate, sulfotetramethylene acrylate, sulfotetramethylene methacrylate and sulfopentamethylene acrylate, and said sulfoalkyl acrylate salts or methacrylate salts are obtained by neutralizing sulfoalkyl acrylates or methacrylates with bases selected from sodium hydroxide, lithium hydroxide, potassium hydroxide, copper hydroxide, magnesium chloride and aluminium hydroxide, or with ammonia or methyl amine or ethyl amine.

8. A composition for forming an electrically conductive resin film according to claim 1, in which said phosphoric acid esters or phosphate esters of 2-hydroxyalkyl acrylates or methacrylates are selected from the group consisting of phosphoryl ethylene acrylate, phosphoryl ethylene methacrylate, phosphoryl trimethylene acrylate, phosphoryl isopropylene methacrylate, phosphoryl trimethylene methacrylate, phosphoryl tetramethylene methacrylate, phosphoryl-1-chloromethyl ethyl methacrylate, phosphoryl - bis-ethyl acrylate, phosphoryl-bis-ethylene methacrylate, phosphoryl-bis-trimethylene acrylate, phosphoryl-bis-isopropylene methacrylate, phosphoryl-bis-trimethylene methacrylate, phosphoryl - bis-tetramethylene acrylate and phosphoryl-bis-tetramethylene methacrylate, and said phosphoric acid esters or phosphate esters of 2-hydroxyalkyl acrylate salts or methacrylate salts are obtained by neutralizing phosphoric acid esters or phosphate esters of 2-hydroxyalkyl acrylates or methacrylates with bases selected from sodium hydroxide, lithium hydroxide, potassium hydroxide, copper hydroxide, magnesium chloride and aluminium hydroxide, or with ammonia or methyl amine or ethyl amine.

9. A composition for forming an electrically conductive resin film according to claim 1, in which said resinous compound is (a) reaction product of phosphoric acid or phosphorous compound with addition polymer of (1) acrylic copolymer with an epoxy group-containing ethylenically unsaturated monomer, acrylic acid chloride or methacrylic acid chloride when the acrylic copolymer contains a hydroxyl group, (2) acrylic copolymer with an epoxy group-containing ethylenically unsaturated monomer when the acrylic copolymer contains a carboxyl group, or (3) acrylic copolymer with an ethylenically unsaturated monomer containing a hydroxyl or carboxyl group when the acrylic copolymer contains an epoxy group, or (b) reaction product of polyvinyl alcohol with ethylenically unsaturated monomer having a functional group selected from the group consisting of acrylic acid, methacrylic acid, glycidyl acrylate, glycidyl methacrylate, acrylic acid chloride and methacrylic acid chloride and a phosphorous compound selected from the group consisting of phosphorous oxychloride, phosphorous pentachloride and phosphorous trichloride.

10. A composition for forming an electrically conductive resin film according to claim 1 in which said composition further comprises compound (C) having one polymerizable ethylene group of less than 30 parts by weight per 100 parts by weight of the total of the (A) and (B) selected from the group consisting of:

(1) styrene and its derivatives

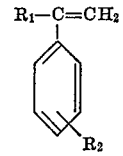

wherein $R_1$ is hydrogen or methyl group and $R_2$ is hydrogen, methyl group or chlorine, (2) acrylic or methacrylic monomers

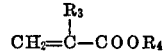

wherein $R_3$ is hydrogen or methyl group and $R_4$ is hydrogen, alkyl group having 1 to 16 carbon atoms, hydroxyalkyl group having 2 to 3 carbon atoms, glycidyl group and a dialkylamino alkyl group such as

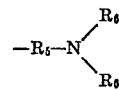

wherein $R_5$ is alkylene group having 1 to 2 carbon atoms and $R_6$ is alkyl group having 1 to 2 carbon atoms, and (3) vinylidene compounds

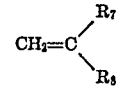

wherein $R_7$ is hydrogen or methyl group and $R_8$ is nitrile group, carbamoyl group, N-methylolcarbamoyl group, alkylether N-methylolcarbamoyl group such as —$CONHCH_2OR_9$, wherein $R_9$ is alkyl group having 1 to 4 carbon atoms, or acetoxy group, or (4) a compound having two or more polymerizable ethylenically unsaturated groups of less than 60 parts by weight per 100 parts by weight of the total of the (A) and (B); and/or compound (D) which is a polymerization initiator and/or an additive of less than 10 parts by weight per 100 parts by weight of the total of the (A) and (B) in which the additive is selected from the group consisting of metal powders, dyestuffs, electrically conductive fillers and electrically non-conductive resins.

11. A composition for forming an electrically conductive resin film according to claim 10, in which said polymerizable ethylenically unsaturated compound (C) is selected from the group consisting of:
  (1) styrene and its derivatives selected from the group consisting of styrene, vinyl toluene, 2-methyl styrene and chlorostyrene,
  (2) acrylic or methacrylic monomers selected from the group consisting of acrylic acid, methacrylic acid, methyl acrylate, methyl methacrylate, butyl acrylate, butyl methacrylate, 2-ethyl hexyl acrylate, 2-ethyl hexyl methacrylate, octyl acrylate, octyl methacrylate, lauryl methacrylate, 2-hydroxyethyl acrylate, 2-hydroxyethyl methacrylate, 2-hydroxypropyl acrylate, 2-hydroxypropyl methacrylate, glycidyl acrylate, glycidyl methacrylate, dimethylaminomethyl acrylate, dimethylaminoethyl methacrylate, diethylaminoethyl acrylate and diethylaminoethyl methacrylate,
  (3) vinylidene compounds selected from the group consisting of acrylonitrile, methacrylonitrile, acrylamide, methacrylamide, ethylether-N-methylol acrylamide ethylether-N-methylol methacrylamide, butylether-N-methylol acrylamide, propylether-N-methylol methacrylamide and vinyl acetate, and
  (4) polyfunctional unsaturated compounds selected from the group consisting of unsaturated compounds having at least two ethylenically unsaturated groups, obtained by reacting an ethylenically unsaturated compound having one hydroxyl group with a polyisocyanate compound having at least two isocyanate groups and/or a polyhydric alcohol having at least two hydroxyl group, unsaturated esters formed by the reaction between an ethylenically unsaturated compound having one carboxyl group and a polyhydric alcohol having at least two hydroxy groups, N,N'-alkylene-bis-acrylamides, N,N' - alkylene-bis-methacrylamides, dimaleylimides, and diallyl compounds.

12. A composition for forming an electrically conductive resin film according to claim 10, in which said polymerization initiator (D) is selected from the group consisting of organic peroxides, organic azo compounds, organic sulfur compounds, organic carbonyl compounds and metal salts.

References Cited
UNITED STATES PATENTS 3,419,534   12/1968   Rembaum et al. _____ 252—500

JOHN D. WELSH, Primary Examiner

U.S. Cl. X.R.

252—518